(12) United States Patent
Ankney et al.

(10) Patent No.: US 10,288,502 B1
(45) Date of Patent: May 14, 2019

(54) TORQUE TUBE STRAIN GAUGE WITH POWER GENERATOR

(71) Applicant: Hamilton Sundstrand Corporation, Charlotte, NC (US)

(72) Inventors: Darrell E. Ankney, Dixon, IL (US); Jason Michael Kluga, DeKalb, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/886,938

(22) Filed: Feb. 2, 2018

(51) Int. Cl.
*G01L 3/00* (2006.01)
*G01L 3/10* (2006.01)
*B64F 5/60* (2017.01)
*B64C 13/24* (2006.01)

(52) U.S. Cl.
CPC ............... *G01L 3/108* (2013.01); *B64F 5/60* (2017.01); *B64C 13/24* (2013.01)

(58) Field of Classification Search
USPC .................................................. 73/862.338
See application file for complete search history.

(56) References Cited

U.S. PATENT DOCUMENTS

| 3,881,347 A | 5/1975 | Buchele |
| 4,129,202 A | 12/1978 | Winters et al. |
| 4,629,024 A | 12/1986 | Buike et al. |
| 5,027,303 A | 6/1991 | Witte |
| 6,472,656 B2 | 10/2002 | Arai |
| 7,683,274 B2 * | 3/2010 | Dellac ................... G01L 5/0004 177/211 |
| 2009/0145239 A1 * | 6/2009 | Girshovich .............. G01B 7/16 73/779 |
| 2009/0173823 A1 * | 7/2009 | Shetzer .................. B64D 29/06 244/129.4 |
| 2010/0262283 A1 * | 10/2010 | Ayers ..................... B25J 9/1085 700/245 |
| 2017/0110993 A1 | 4/2017 | Hamel et al. |

* cited by examiner

*Primary Examiner* — Max H Noori
(74) *Attorney, Agent, or Firm* — Cantor Colburn LLP (57) ABSTRACT

A torque tube sensor to measure torque on a torque tube or shaft includes: a sensor body including at least a first body section and a second body section; one or more strain gauges including a first strain gauge disposed in the first body section; at least one transmitter; and strain gauge circuitry connected to the first strain gauge and at least three other resistive elements in a Wheatstone bridge configuration including two arms, the transmitter being connected between the two arms. The sensor also includes at least one receiver configured to receive signals generated by the at least one transmitter; and an armature carried by the first body section that interacts with a permanent magnet stator, the armature being in electrical contact with the strain gauge circuitry and providing power to the strain gauge circuitry and the receiver. The sensor can be part of an assembly.

17 Claims, 8 Drawing Sheets

TORQUE TUBE STRAIN GAUGE WITH POWER GENERATOR

BACKGROUND

Exemplary embodiments pertain to the art of strain gauges and, in particular, to a strain gauge for a tube that can be used, for example to drive actuators in an aircraft.

Modem aircraft often use a variety of high lift leading and trailing edge devices to improve high angle of attack performance during various phases of flight, for example, takeoff and landing. One such device is a trailing edge flap. Current trailing edge flaps generally have a stowed position in which the flap forms a portion of a trailing edge of a wing, and one or more deployed positions in which the flap extends forward and down to increase the camber and/or plan form area of the wing. The stowed position is generally associated with low drag at low angles of attack and can be suitable for cruise and other low angle of attack operations. The extended position(s) is/are generally associated with improved air flow characteristics over the aircraft's wing at higher angles of attack.

In general, such devices can include a control unit that causes a main drive unit to produce rotation of a shaft or "torque tube". This rotation can then be converted to flap extension in known manners such as by use of a ball screw. In such systems, each flap typically includes two actuators, one for each side of the flap.

The speed and position of the torque tubes are measured but not the amount of axial/torsional force that is applied to drive the aircraft surfaces. The actuation system will react to over/under speeds and to surfaces being out of position, but not to an over torque scenario.

In some cases the control surface can get stuck or other problems may occur. Such problems will result in an increase/decrease of torque in the shaft. Being able to measure such changes could be useful in certain instances.

BRIEF DESCRIPTION

Disclosed is a torque tube sensor to measure torque on a torque tube or shaft that includes a sensor body including at least a first body section and a second body section, one or more strain gauges including a first strain gauge disposed in the first body section, and at least one transmitter. The sensor also includes strain gauge circuitry connected to the first strain gauge and at least three other resistive elements in a Wheatstone bridge configuration including two arms, the transmitter being connected between the two arms, at least one receiver configured to receive signals generated by the at least one transmitter; and an armature carried by the first body section that interacts with a permanent magnet stator, the armature being in electrical contact with the strain gauge circuitry and providing power to the strain gauge circuitry and the receiver.

In any prior embodiment, the at least three other resistive elements includes at least a second strain gauge, wherein the first strain gauge is disposed on one arm and the second strain gauge is disposed on the second arm.

In any prior embodiment, the at least three other resistive elements includes at least a third strain gauge and a fourth strain gauge, wherein the third strain gauge is disposed on the first arm and the fourth strain gauge is disposed on the second arm.

In any prior embodiment, the strain gauge circuitry includes an input and an output and one or more switches between the input and output connected in an h-bridge configuration.

In any prior embodiment, the transmitter transmits one of radio frequency or infrared frequency signals.

In any prior embodiment, the receiver receives one of radio frequency or infrared frequency signals.

In any prior embodiment, the first body section includes a first recess formed to receive a torque tab formed at a first location on a torque tube.

In any prior embodiment, the second body section includes a second recess formed to receive a torque tab formed at a second location on the torque tube and wherein the first and second body sections are fastened together.

In any prior embodiment, the torque tube sensor further includes: a stator that surrounds the body portion, the stator including one or more magnets disposed therein.

In any prior embodiment, the receiver is on the stator.

In any prior embodiment, the stator is connected to a portion of an aircraft body.

Also disclosed is a toque tube sensor assembly. The assembly includes: a torque tube including first and second torque tabs formed thereon; a sensor body including at least a first body section and a second body section, the first body section including a first recess that receives the first torque tab and the second body section including a second recess that receives the second torque tab; one or more strain gauges including a first strain gauge disposed in the first body section; at least one transmitter including a first transmitter; strain gauge circuitry connected to the first strain gauge and at least three other resistive elements in a Wheatstone bridge configuration including two arms, the transmitter being connected between the two arms; and at least one receiver configured to receive signals generated by the first transmitter; and a stator that surrounds the body portion, the stator including one or more magnets disposed therein and formed such that the sensor body rotates within the one stator.

In any prior embodiment, also provided is an armature carried by the first body section that interacts with a permanent magnet stator, the armature being in electrical contact with the strain gauge circuitry and providing power to the strain gauge circuitry and the receiver.

In any prior embodiment, the one or more strain gauges includes second, third and fourth strain gauges and the at least three other resistive elements comprise the second, third and fourth strain gauges.

In any prior embodiment, the at least three other resistive elements includes at least a second strain gauge, wherein the first strain gauge is disposed on one arm and the second strain gauge is disposed on the second arm.

In any prior embodiment, the at least three other resistive elements includes at least a third strain gauge and a fourth strain gauge, wherein the third strain gauge is disposed on the first arm and the fourth strain gauge is disposed on the second arm.

In any prior embodiment, the strain gauge circuitry includes an input and an output and one or more switches between the input and output.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the Figures.

As discussed above, flight surfaces that handle large amounts of loads over large distances are subject to mechanical stress and strain. They are subject to jams and fractures of the material and eventual breakdown. In order to prevent this, strain gauges disclosed herein can be used on the tubes of such systems to measure the mechanical strain.

To prevent or reduce damage to the flight surfaces of the actuation systems, a strain gauge system is disclosed. The strain gauges are placed on a rotor/armature clamp on the torque tube. A magnet is provided and rotates with the tube and can cause a voltage to be formed and this voltage can be used to measure the strain gauges.

In one non-limiting embodiment, four strain gauges are present on the rotor/armature clamp, each part of a larger circuit. The strain gauge will be one of four resistors in a Wheatstone bridge. Connecting two arms of the Wheatstone bridge is an IR or RF frequency diode for short range communication. When the strain gauge experiences mechanical strain, its resistance will increase causing a voltage drop across the diode and in turn a current which causes the diode to transmit data to a receiver. A receiver sends the received signal to another location for further processing. The receiver can include an operational amplifier to magnify the signal before being sent to an analog to digital converter (ADC) and then to either CAN BUS or ARINC protocol.

This approach to torque sensing requires no connection to external wiring since IR or RF communication is used. This design also requires no external power since the voltage used to measure the strain gauge is generated from the fixed permanent magnet stator and the rotating of the rotor/armature clamp. Implementation of the device simply requires attachment of a rotor/armature clamp to the drive line with the circuits embedded on the surface of the stator clamp.

Figure 1:
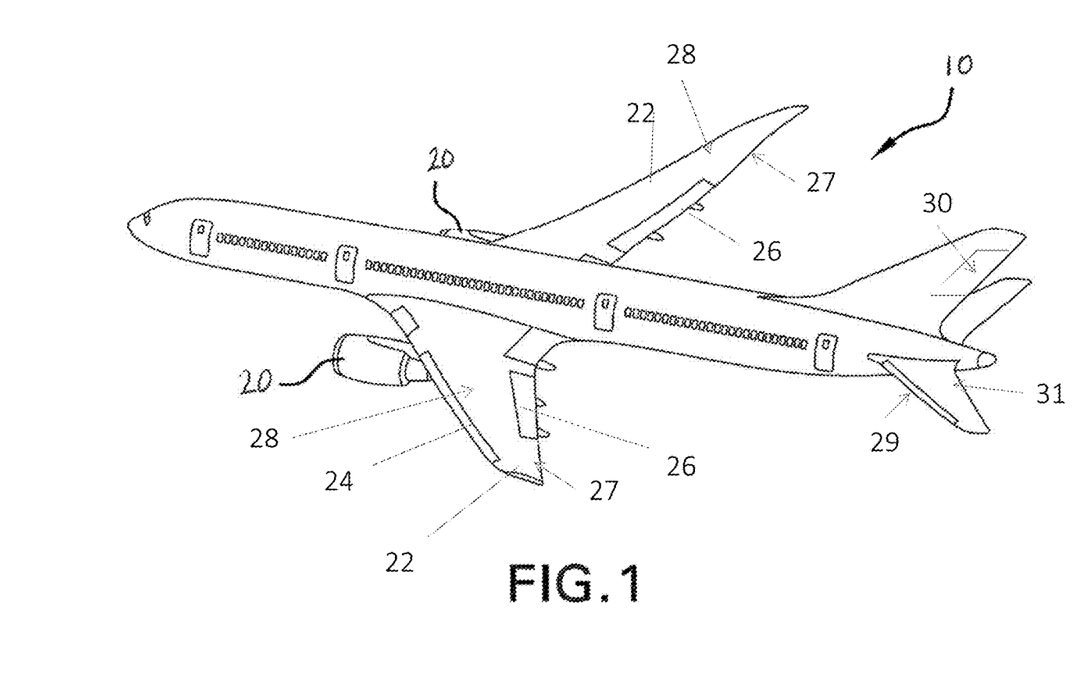
FIG. 1 is a perspective view of an aircraft that includes moveable control surfaces.

FIG. 1 illustrates an example of a commercial aircraft 10 having aircraft engines 20 that may embody aspects of the teachings of this disclosure. The aircraft 10 includes two wings 22 that each include one or more slats 24 and one or more flaps 26. The aircraft further includes ailerons 27, spoilers 28, horizontal stabilizer trim tabs 29, rudder 30 and horizontal stabilizer 31. The term "control surface" used herein includes but is not limited to either a slat or a flap or any of the above described.

Figure 2:
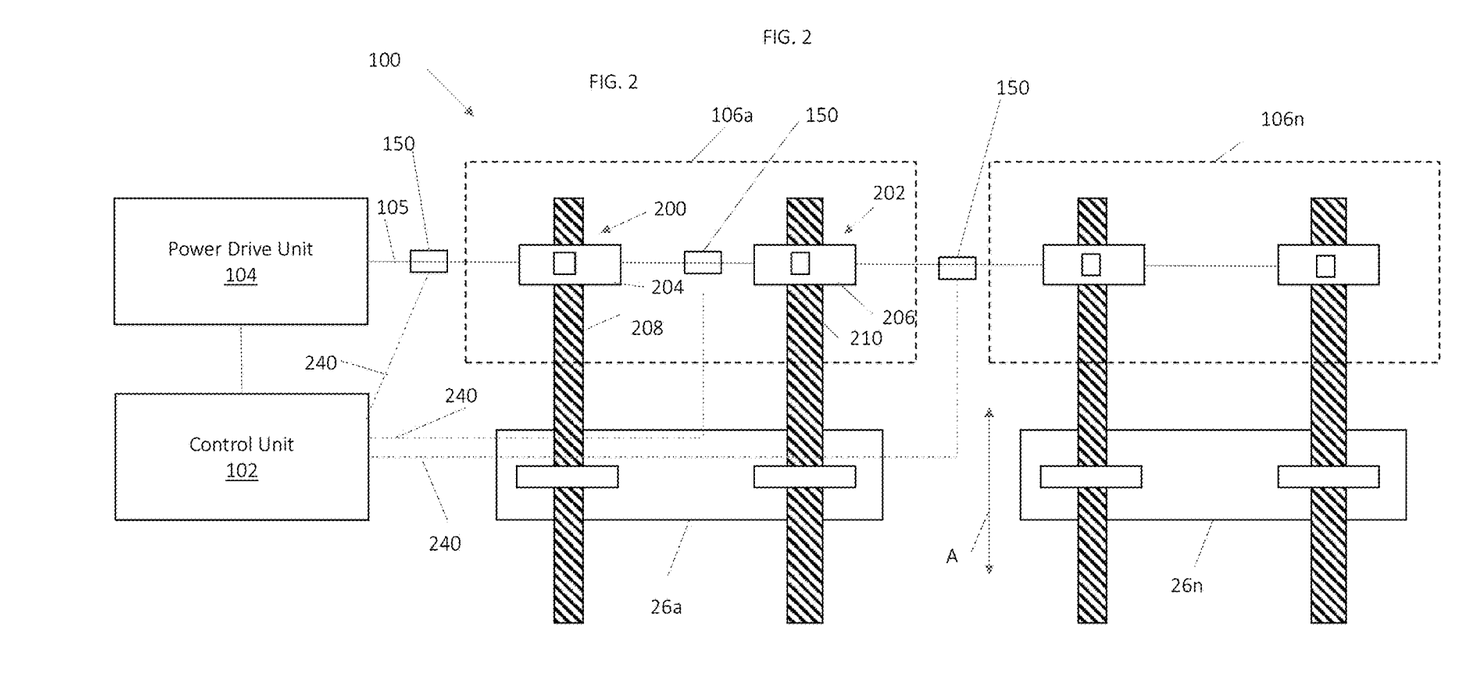
FIG. 2 is an overview of a system in which a torque sensor as described herein can be included.

FIG. 2 illustrates, generally, a system 100 that can control and monitor the location of one or more control surfaces of an aircraft. As illustrated, the control surfaces are flaps 26. In particular, 2 flaps 26a, 26n are illustrated but any number of flaps could be controlled and monitored by the system 100. Further, while flaps 26 are illustrated, the same teachings herein can also be applied to slats 24 and the other control surfaces as shown in FIG. 1.

The system includes a power drive unit 104 (or drive unit for short). The drive unit 104 can cause a rotation of a drive shaft 105 in order to move one or more of the flaps 26 in either direction in or out as generally indicated by arrow A. To convert the rotary motion of the drive shaft 105 into linear motion to move the flaps 26s, one or more actuator units 106a . . . 106n are provided, with each flap or other control surface having its own actuator unit 106.

Each actuator unit 106 includes two actuators. For example, a first actuator unit 106a includes first and second actuators 200, 202. The first actuator 200 includes an actuator drive unit 204 and a linear translation element 208. The actuator drive unit 204 receives rotatory motion from the drive shaft 105 and causes the linear translation element 208 to move linearly in the direction shown generally by arrow A. Similarly, the second actuator 202 includes an actuator drive unit 206 and a linear translation element 210. The actuator drive unit 206 also receives rotatory motion from the drive shaft 105 and causes the linear translation element 210 to move linearly in the direction shown generally by arrow A. In one embodiment, the linear translation units 208, 210 are ball screws. In another, they may be hydraulic or rotary actuators or any other type of electromechanical actuators.

One or more torque sensors 150 are shown in FIG. 2 located in different locations on the shaft 105. The locations shown in FIG. 2 are by way of example only and can be varied.

Each of the sensors 150 can provide a wireless signal to a receiver. The received signal can be relayed either wirelessly or via a wire (or a combination thereof) to a control unit 102 via communication paths 240. The control unit 102 can be used to control operation of the power drive unit 104.

The controller 102 issues commands to cause the drive unit 104 to rotate shaft 105. The rotation causes linear motion of the linear translating elements 208, 210. The amount of torque on the shaft should be less than a predetermined amount in normal operating conditions. If the torque received from one of the sensors 150 exceeds this amount, the controller 102 can determine that an error exists and notify another control unit or act independently.

In either case, depending on the outputs of the sensors, skew and actuator malfunctions can be discovered, that are generally referred to as "error conditions" herein. These error conditions can be determined by comparisons to the sensor outputs and what is expected based on what instructions the control unit 102 provides to the drive unit 104. For instance, the control unit 102 can instruct the drive unit 104 to move the flaps to a fully extended position. If the torque difference between two of the sensors 150 is greater than expected, it could indicate that an actuator jam or other failure (e.g., skew) exists.

Figure 3:
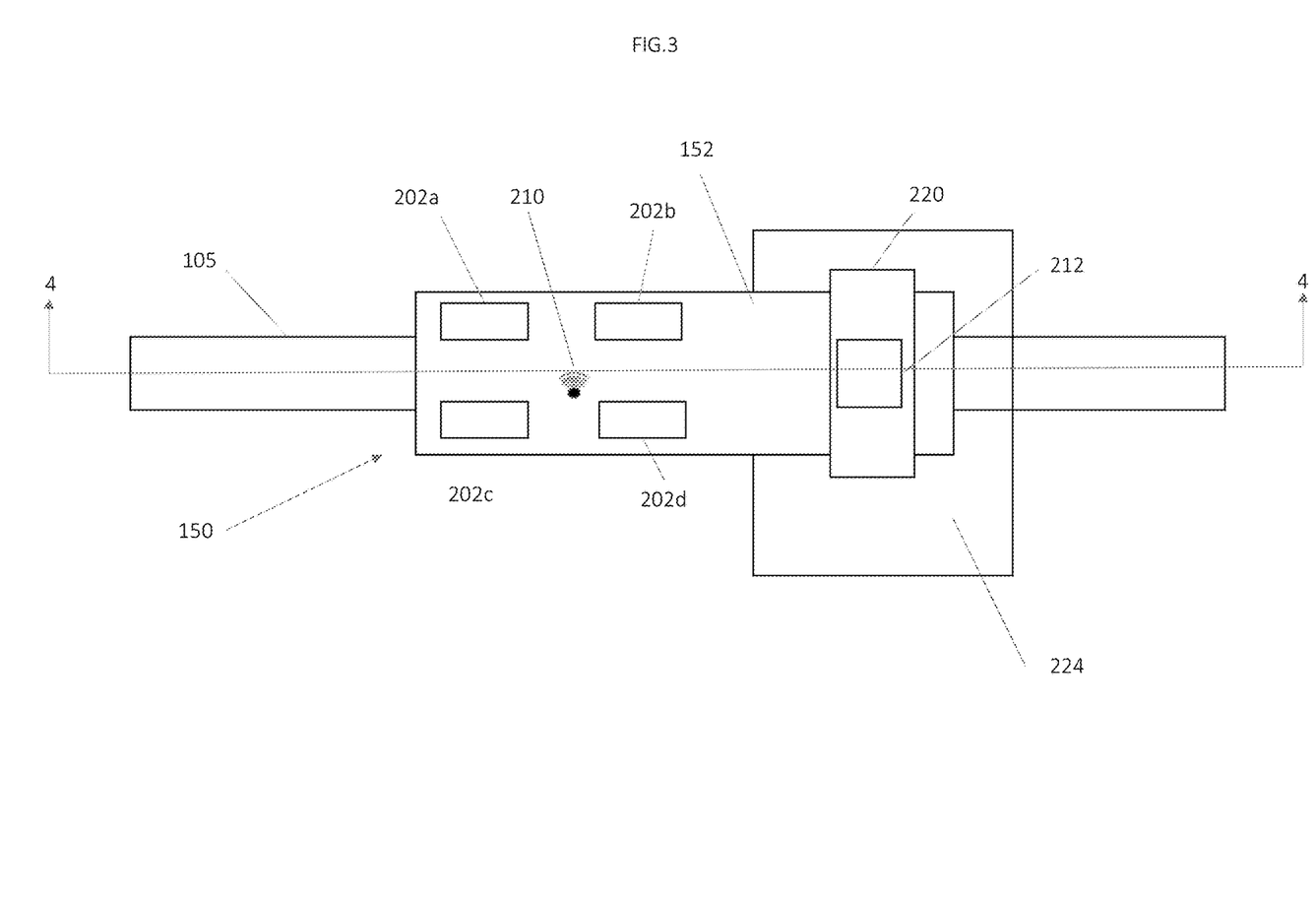
FIG. 3 is an overhead view of torque sensor according to one embodiment.

FIG. 3 shows a top view of a sensor 150 coupled to a shaft or torque tube 105. The sensor 150 includes a sensor body that, as shown below includes at least first and body sections. The sensor 150 includes two portions, the aforementioned body and a stator portion 220. The stator portion 220 is also referred to as a stator herein. In operation, the stator 220 can be fixed to a portion of the structure in which the sensor is disposed. For example, the stator 220 can be fixed to a fixed portion 224 that is part of an aircraft, an in particular, to a part of aircraft wing or other flight control structure. As shown more fully below, the stator 220 can include magnets and the body portions can include an armature in the form or windings. The stator remains still relative to the body portions and this causes a voltage/current to be created in the armature. This current can be used to power certain components located in the body such as strain sensors and a transmitter. In this manner, the sensor 150 is self-powered.

The sensor 150 includes one or more strain gauges 202*a*, 202*b*, 202*c*, 202*d* disposed in the body thereof. It will be understood that only one sensor is required (e.g., 202*a*) and the other sensors are replaced with resistive elements in one embodiment.

As shown below, in FIG. 4, the body can include a first body section 152 and second body section 154. Each can include some or all of the components of the other section. For example, in FIG. 3 the first body portion 152 includes the strain gauges 202*a*, 202*b*, 202*c*, 202*d*. One or more additional strain gauges could be included in the second body portion 154.

Referring again to FIG. 3, differences in the readings of the strain gauges 202*a*, 202*b*, 202*c*, 202*d* will cause the transmitter 210 to generate a signal. The transmitter 210 can be either an infrared (IR) or radio frequency (RF) diode.

The signal generated by the transmitter can be received by one or more receivers 212 located on the stator 220. In this manner, a wireless signal can be provided to the stator and then provided to the controller 102 for processing. In one embodiment the processing can be performed according to at least one of the manners described above.

Each of the included strain gauges 202*a*, 202*b*, 202*c* and 202*d* can measure a strain in the body in which it is disposed. Referring now to FIG. 4, the tube 105 includes one or more tabs 420 that extend outward from an outer diameter of the tube 105. The first portion 152 and the second portion 154 include recesses 502 (see FIG. 5) sized and configured to receive the tabs 420. The tabs can be of any shape and may also be referred to as pins.

In operation, fasteners (not shown) are inserted into fastener holes 450. This allows for the body portions 152, 154 to be coupled to the tube 105 in such a manner that as the tube 105 rotates, so do the body portions. The tabs 420 allow for torque experienced in the tube 105 to be transferred into the body portions 152, 154 to allow for the strain sensors therein to determine if a threshold torque value has been exceeded.

Figure 4:
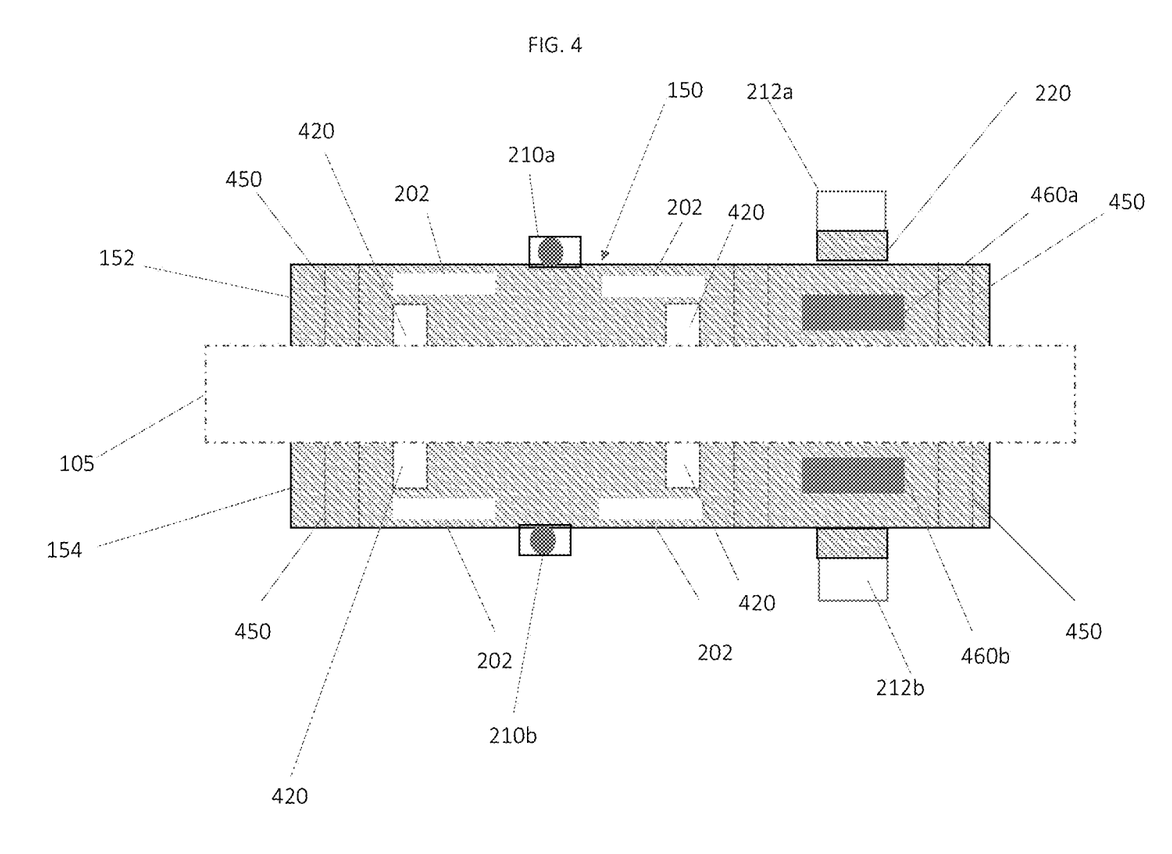
FIG. 4 is a cross section of the sensor of FIG. 3 taken along line 4-4.

With further reference to FIG. 4, each portion 152, 154 includes a transmitter 212*a*, 212*b*, respectively. The transmitter is operable to transmit when the strain sensors have values that indicate excessive torque in the tube 105. The first and second body portions 152, 154 also each include an armature in the form of windings 460*a*, 460*b*, respectively.

Due to rotation, magnets in the stator 220 cause electrical currents/voltages to be created in the windings 460*a*, 460*b*. These electrical currents/voltages can be used to power the strain sensors 202, the transmitters 210*a*, 210*b* and any other element that needs electrical power to operate.

Figure 5:
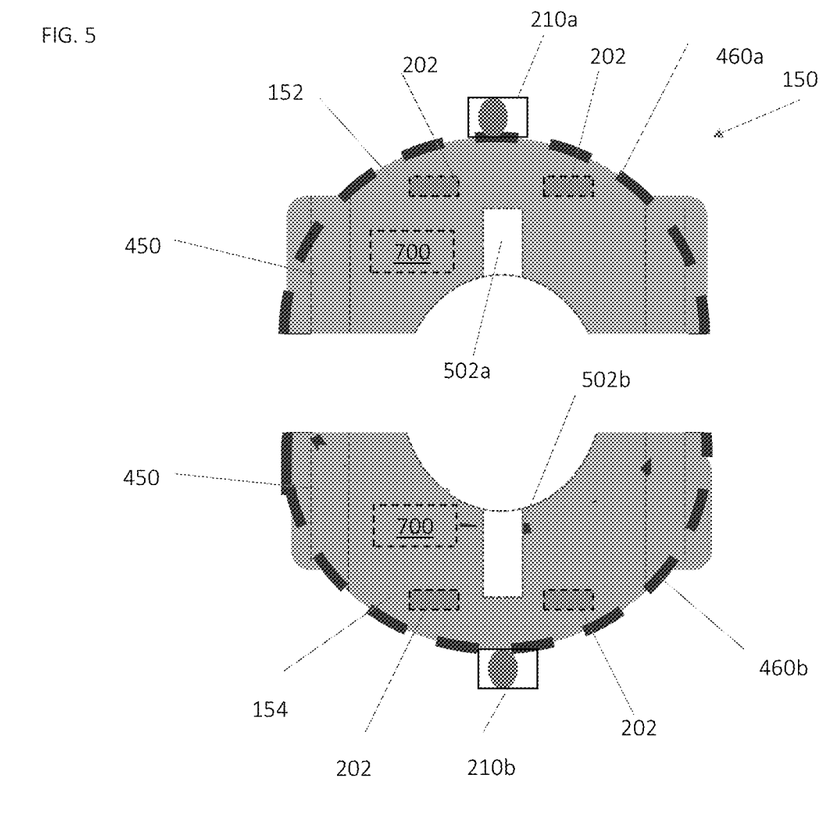
FIG. 5 is an end view of the sensor body portions according to one embodiment.

FIG. 5 shows the first portion 152 separated from the second portion 154 and that can be held together by using a fastener through fastener holes 450. The windings 460*a*/460*b* are shown as being on an outer edge of the portions 152/154 but this is not required and they can be embedded further within the body portions 152/154 depending on the circumstances and the materials that form the body portions 152/154. As discussed above, relative motion between the windings 460*a*/460*b* and the portions 152/154 with the tube will induce currents/voltages in the windings that can be used to power the sensors 202 and transmitters 210*a* and 210*b*. As shown, each portion includes sensors 202 and transmitters 210 but in one embodiment, only one portions needs to include the sensors 202 and/or transmitter.

The two body portions 152/154 can include first and second recesses 502*a*, 502*b*, respectively, that receive the torque tabs 420 of the tube 105 (FIG. 4). Other recesses can also be provided such as receive third and fourth torque tabs as illustrated in FIG. 4.

Figure 6:
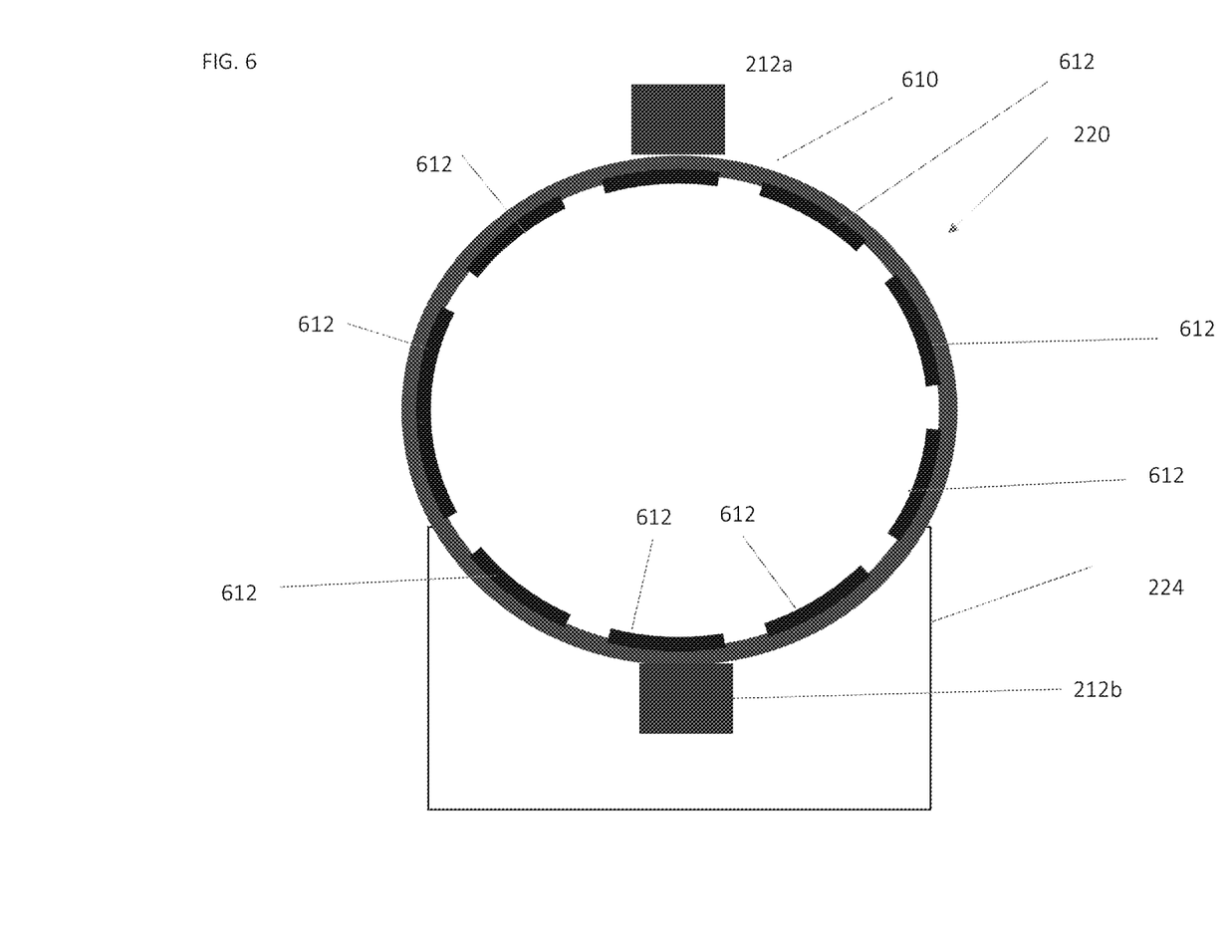
FIG. 6 is an end view of stator according to one embodiment.

FIG. 6 shows an end view of the stator 220. The stator 220 includes one or mare magnets 612 mounted to an outer support 610. One or more receivers 212*a*/212*b* can be disposed on the stator 220. The stator 220 is supported by a fixed portion 224. The fixed portion 224 can be part of an aircraft, and in particular, a part of an aircraft wing or other flight control structure.

Figure 7:
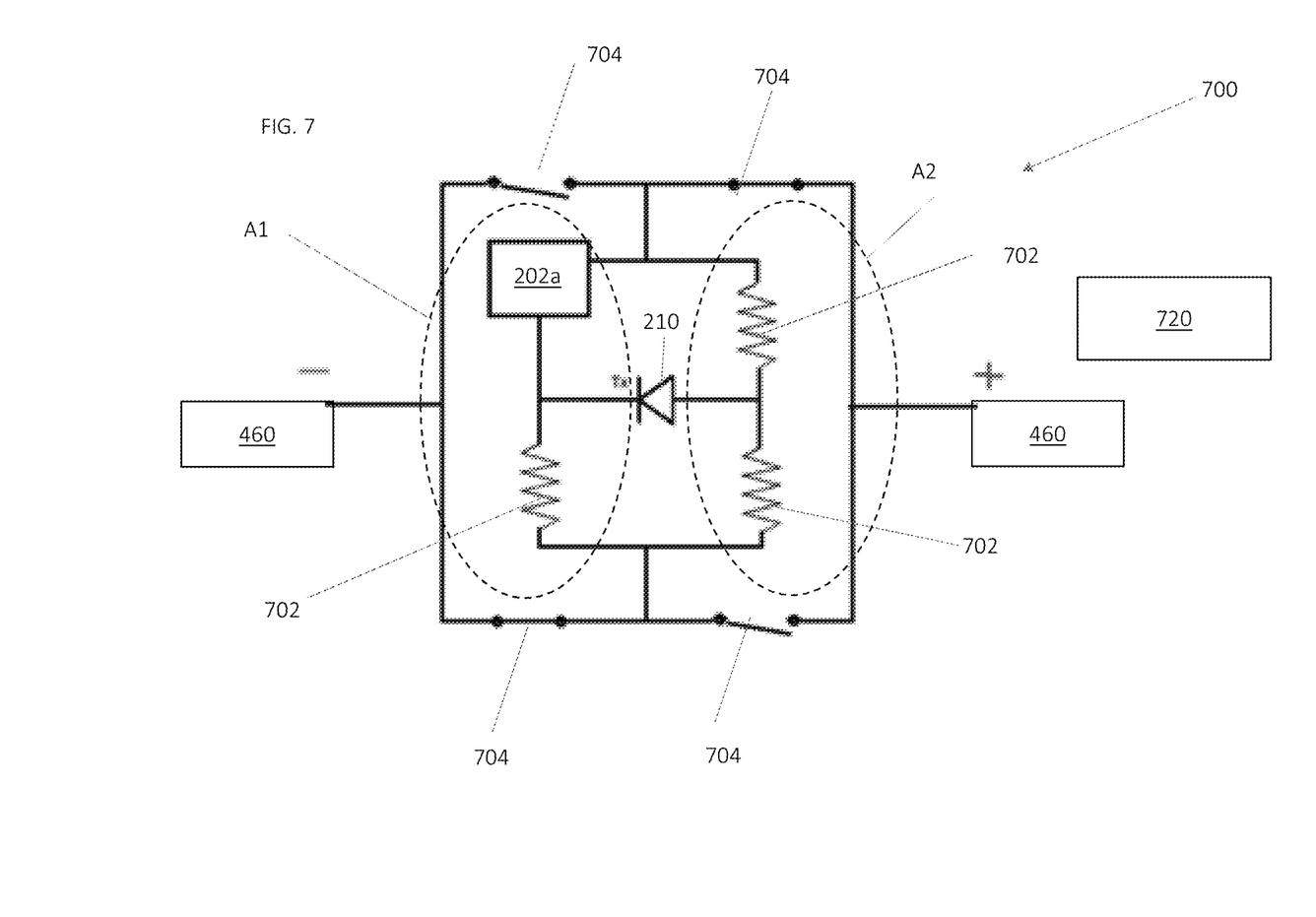
FIG. 7 is a circuit diagram of strain gauge circuitry according to one embodiment.

FIG. 7 shows a diagram of strain gauge circuitry 700 according to one embodiment. The strain gauge circuitry 700 can be disposed in the first portion 152 in one embodiment. In another embodiment, both the first and second portions 152/154 include strain gauge circuitry. This is generally shown by inclusion of strain gauge circuitry 700 in both portions in FIG. 5 but it should be understood that such circuitry is not required in both portions depending on whether or not both portions include strain gauges 202.

As shown in FIG. 7, the strain gauge circuitry 700 includes the first strain gauge 202*a* and at least three other resistive elements 702 in a Wheatstone bridge configuration including two arms A1 and A2. The transmitter 210 is connected between the two arms A1 and A2. Power can be provided through inputs (+) and (−). These inputs can be provided from the windings 460. It will be understood that while multiple strain gauges were shown above, only one (or one per sensor portion) is needed in some embodiments.

As will be understood, the voltage/current provided at the input/output can be an alternating current (AC) current/voltage. As such, one or more switches 704 are provided that will rectify the input power. Control of these switches can be accomplished by a controller 720 based on the input current/voltage as will be understood by the skilled artisan. The switches are arranged as an h-bridge that drives the "load" comprising the gauge 202*a*, resistive elements 702 and the transmitter 210.

In operation, the strain gauge 202 will change resistance as the torque in the body changes. If the value changes enough, a voltage differential between the arms A1 and A2 will be created that will forward bias the transmitter 210 causing it to transmit. Such a transmission indicates an over torque situation.

Figure 8:
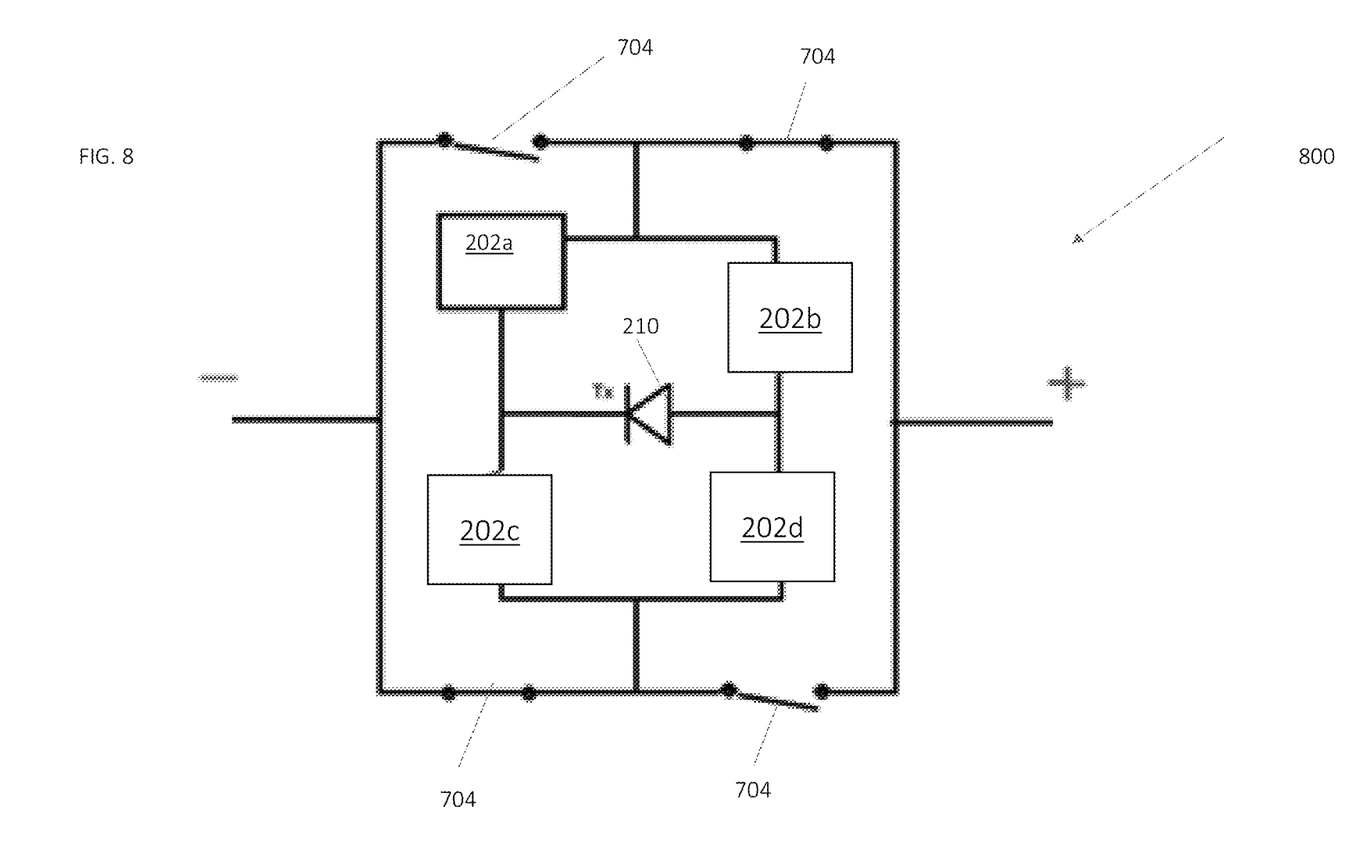
FIG. 8 is a circuit diagram of strain gauge circuitry according to another embodiment.

As shown in FIG. 8, the alternative strain gauge circuitry 800 includes the first strain gauge 202*a* and three other strain gauges 202*b*, 202*c*, and 202*d* in a Wheatstone bridge configuration including two arms A1 and A2. The transmitter 210 is connected between the two arms A1 and A2. Power can provided though inputs (+) and (−). These input can be provided from the windings 460 as above. Further, the one or more switches 704 are provided that will rectify the input power. Control of these switches can be accomplished by a controller 720 based on the input current/voltage as will be understood by the skilled artisan. The switches are arranged as an h-bridge that drives the "load" comprising the gauges 202*a*-*d* and the transmitter 210.

In operation, the strain gauges 202 will change resistance as the torque in the body changes. If the value changes enough, a voltage differential between the arms A1 and A2 will be created that will forward bias the transmitter 210 causing it to transmit. Such a transmission indicates an over torque situation.

Of course, in both cases shown, a calibration step may be required to set the strain gauges so they work properly together (FIG. 8) or so the strain gauge and the resistive elements work properly together (FIG. 7).

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A torque tube sensor to measure torque on a torque tube or shaft comprising:
    a sensor body including at least a first body section and a second body section;
    one or more strain gauges including a first strain gauge disposed in the first body section;
    at least one transmitter;
    strain gauge circuitry connected to the first strain gauge and at least three other resistive elements in a Wheatstone bridge configuration including two arms, the transmitter being connected between the two arms;
    at least one receiver configured to receive signals generated by the at least one transmitter; and
    an armature carried by the first body section that interacts with a permanent magnet stator, the armature being in electrical contact with the strain gauge circuitry and providing power to the strain gauge circuitry and the receiver.

2. The torque tube sensor of claim 1, wherein the at least three other resistive elements includes at least a second strain gauge, wherein the first strain gauge is disposed on one arm and the second strain gauge is disposed on the second arm.

3. The torque tube sensor of claim 2, wherein the at least three other resistive elements includes at least a third strain gauge and a fourth strain gauge, wherein the third strain gauge is disposed on the first arm and the fourth strain gauge is disposed on the second arm.

4. The torque tube sensor of claim 3, wherein the strain gauge circuitry includes an input and an output and one or more switches between the input and output connected in an h-bridge configuration.

5. The torque tube sensor of claim 1, wherein the transmitter transmits one of radio frequency or infrared frequency signals.

6. The torque tube sensor of claim 5, wherein the receiver receives one of radio frequency or infrared frequency signals.

7. The torque tube sensor of claim 1, wherein the first body section includes a first recess formed to receive a torque tab formed at a first location on a torque tube.

8. The torque tube sensor of claim 1, wherein the second body section includes a second recess formed to receive a torque tab formed at a second location on the torque tube and wherein the first and second body sections are fastened together.

9. The torque tube sensor of claim 1, further comprising:
    a stator that surrounds the body portion, the stator including one or more magnets disposed therein.

10. The torque tube sensor of claim 9, wherein the receiver is on the stator.

11. The torque tube sensor of claim 9, wherein the stator is connected to a portion of an aircraft body.

12. A torque tube sensor assembly comprising:
    a torque tube including first and second torque tabs formed thereon;
    a sensor body including at least a first body section and a second body section, the first body section including a first recess that receives the first torque tab and the second body section including a second recess that receives the second torque tab;
    one or more strain gauges including a first strain gauge disposed in the first body section;
    at least one transmitter including a first transmitter;
    strain gauge circuitry connected to the first strain gauge and at least three other resistive elements in a Wheatstone bridge configuration including two arms, the transmitter being connected between the two arms; and
    at least one receiver configured to receive signals generated by the first transmitter; and
    a stator that surrounds the body portion, the stator including one or more magnets disposed therein and formed such that the sensor body rotates within the one stator.

13. The torque tube sensor assembly of claim 12, further including:
    an armature carried by the first body section that interacts with a permanent magnet stator, the armature being in electrical contact with the strain gauge circuitry and providing power to the strain gauge circuitry and the receiver.

14. The torque tube sensor assembly of claim 12, wherein the one or more strain gauges includes second, third and fourth strain gauges and the at least three other resistive elements comprise the second, third and fourth strain gauges.

15. The torque tube sensor assembly of claim 12, wherein the at least three other resistive elements includes at least a second strain gauge, wherein the first strain gauge is disposed on one arm and the second strain gauge is disposed on the second arm.

16. The torque tube sensor assembly of claim 15, wherein the at least three other resistive elements includes at least a third strain gauge and a fourth strain gauge, wherein the third strain gauge is disposed on the first arm and the fourth strain gauge is disposed on the second arm.

17. The torque tube sensor assembly of claim 12, wherein the strain gauge circuitry includes an input and an output and one or more switches between the input and output.

* * * * *